W. L. GILL.
ELECTRIC STORAGE BATTERY.
APPLICATION FILED SEPT. 30, 1920.
1,425,469.
Patented Aug. 8, 1922.
2 SHEETS—SHEET 1.
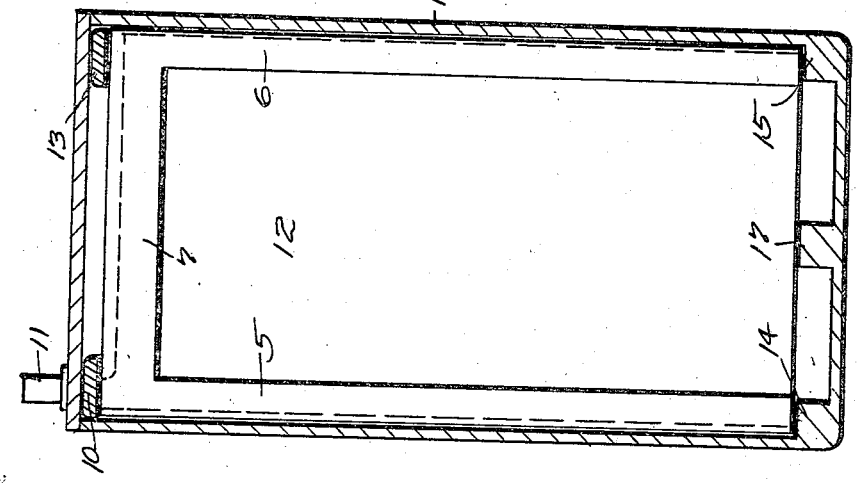
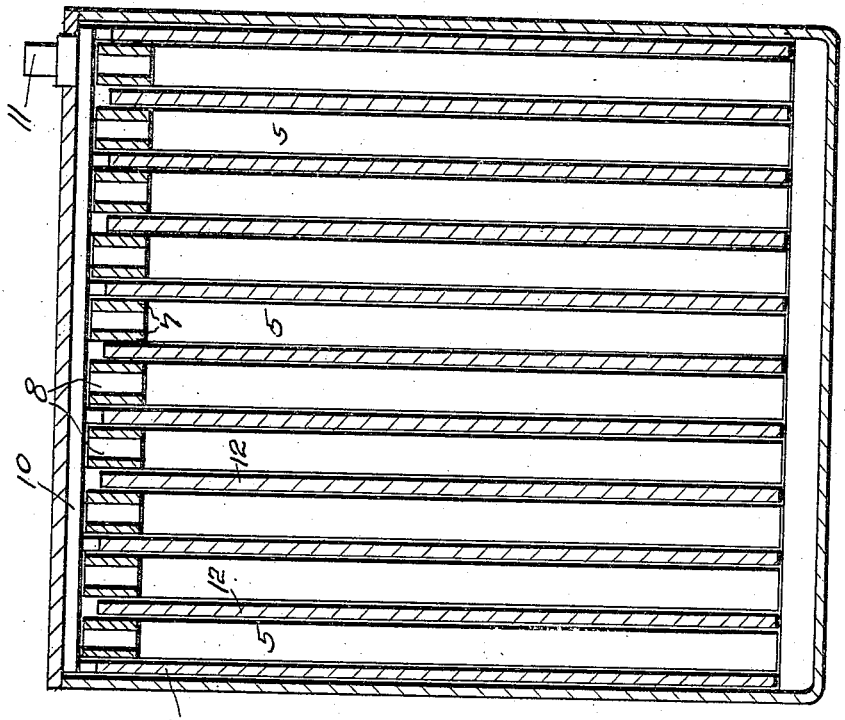
W. L. Gill
INVENTOR.
BY
Shepherd & Campbell
ATTORNEYS.

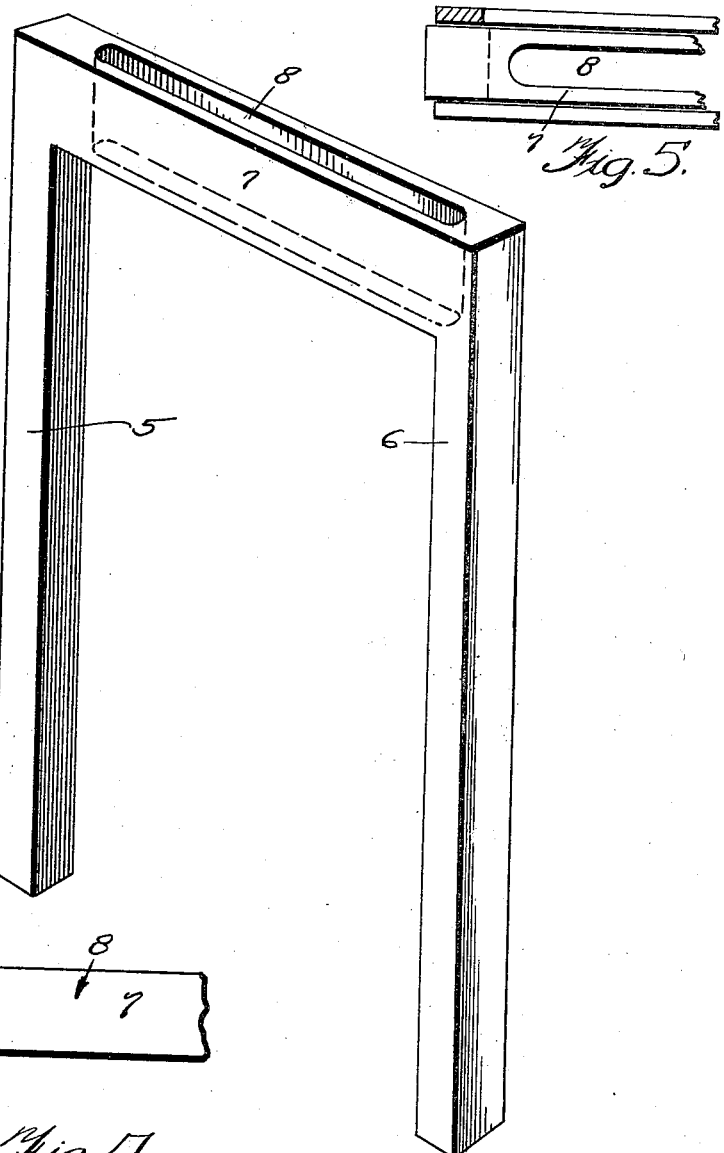

UNITED STATES PATENT OFFICE.

WALTER LAWRENCE GILL, OF SAN BERNARDINO, CALIFORNIA.

ELECTRIC STORAGE BATTERY.

1,425,469. Specification of Letters Patent. Patented Aug. 8, 1922.

Application filed September 30, 1920. Serial No. 413,749.

*To all whom it may concern:*

Be it known that I, WALTER LAWRENCE GILL, citizen of the United States, residing at San Bernardino, in the county of San Bernardino and State of California, have invented certain new and useful Improvements in Electric Storage Batteries, of which the following is a specification, reference being had therein to the accompanying drawings.

The present invention relates to an electric storage battery of the type of that disclosed in my copending application Serial Number 375,916, filed April 23, 1920. In the battery disclosed in the aforesaid application, insulating materials between the positive and negative plates of the batteries were dispensed with and the plates were disposed transversely of the battery jar, instead of longitudinally thereof as has heretofore been the practice. The present invention contemplates the same relation of parts but involves the use of an improved form of separator for holding the plates of the battery in properly spaced relation. The invention further contemplates the use of a novel form of battery jar adapted to have coactive relation to the new type of separator above referred to.

Further objects and advantages of the invention will be set forth in the detailed description which follows.

In the accompanying drawing:

Fig. 1 is a longitudinal sectional view of a battery constructed in accordance with the invention;

Fig. 2 is a transverse vertical sectional view therethrough;

Fig. 3 is a perspective view of one of the separators hereinafter described;

Fig. 4 is a partial vertical sectional view through one of said separators; and

Fig. 5 is a partial plan view illustrating the relation of one of the separators to a pair of the plates.

Like numerals designate corresponding parts in all of the figures of the drawing.

The separators or spacers constituting the principal feature of novelty over my application aforesaid are of inverted U shape, see Fig. 3, and comprise the legs 5 and 6 and a transverse connecting head 7. The head 7 is vertically slotted at 8 to provide an opening for the escape of gases generated in the battery.

As is common in battery construction, one set of the plates indicated at 9 is secured to a connecting strap 10 carrying a terminal 11 and the other set of plates 12 is secured to a common connecting strap 13 which carries the other terminal (not shown). The separators shown in Fig. 3 are located between the plates and the ends of the legs 5 and 6 rests upon ribs 14 and 15 integral with the battery jar 16. The lower edges of the plates rests upon the ribs 14 and 15 and upon a central rib 17, likewise integral with the battery jar. It will be observed that the plates extend transversely of the battery jar and that the ribs 14, 15 and 17 extend longitudinally of the battery jar. The separators or spacers shown in Fig. 3 are of such height as to directly underlie the straps 10 and 13. They are also of such height as to extend slightly above the upper edges of the plates. This aids in preventing the plates from buckling. The structure shown and described leaves the main space between the plates free and spaces the plates a sufficient distance apart to obviate the necessity of using insulating material between said plates. The separators are to be made in one piece of any suitable material, such as fiber, glass, wood, hard rubber, celluloid or the like. It is to be noted that the divider is entirely open at the bottom so that the sediment from the plate may fall below the bottom of the plates to the floor of the battery jar, where it will lie between the ribs 14 and 17 and 15 and 17 and entirely out of contact with the plates.

The thickness of the separators will vary with the size of the battery; that is the larger the battery the thinner the separators will be because in the larger battery there are more plates than in a smaller battery and hence there is less space between the plates. It will be observed that this separator is of very simple and inexpensive construction; will hold the plates firmly in properly spaced relation; will leave the space between the plates entirely open at the bottom and will extend above the tops of the plates to prevent buckling of said plates.

It is to be understood that the invention is not limited to the precise construction set forth but that it includes within its purview whatever changes fairly come within either the terms or the spirit of the appended claims.

Having described my invention, what I claim is:

1. A separator for storage batteries of inverted U shape comprising transverse connecting heads and a pair of legs depending from the ends thereof, the space between said legs being free and unobstructed throughout the width of the separators and said separator being of a thickness to bear against the confronting faces of adjacent plates throughout the height and across the top portions of said plates.

2. A separator for storage batteries of inverted U shape consisting of a transverse connecting head and a pair of legs depending from the opposite ends of said head, said legs and said head being of uniform width throughout and said head having an opening formed therethrough, the space between said legs being free and unobstructed throughout the width of the separator and said separator being of a thickness to bear against the confronting faces of adjacent plates throughout the height and across the top portions of said plates.

3. A storage battery comprising a containing jar, alternating negative and positive plates therein and separators between said plates, each of said separators comprising a transverse connecting head and a pair of legs depending from the opposite end thereof, said legs and head being of uniform width throughout to thereby engage with the plates at all points along their confronting surfaces, the space between said legs being free and unobstructed throughout the width of the separator.

4. A structure as recited in claim 3 wherein the separators are provided with openings through said heads.

In testimony whereof I hereunto affix my signature.

WALTER LAWRENCE GILL.